(12) United States Patent
Craddock et al.

(10) Patent No.: US 8,265,092 B2
(45) Date of Patent: Sep. 11, 2012

(54) ADAPTIVE LOW LATENCY RECEIVE QUEUES

(75) Inventors: David Craddock, New Paltz, NY (US); Thomas A. Gregg, Highland, NY (US); Thomas Schlipf, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 1397 days.

(21) Appl. No.: 11/855,401

(22) Filed: Sep. 14, 2007

(65) Prior Publication Data
US 2009/0077567 A1 Mar. 19, 2009

(51) Int. Cl.
*H04L 12/28* (2006.01)
(52) U.S. Cl. .................................. 370/412; 370/392
(58) Field of Classification Search .................... None
See application file for complete search history.

(56) References Cited

U.S. PATENT DOCUMENTS

| | | | |
|---|---|---|---|
| 6,834,332 B2 * | 12/2004 | Craddock et al. ............ 711/159 |
| 6,947,437 B1 | 9/2005 | Erimli et al. |
| 7,016,299 B2 | 3/2006 | Kashyap |
| 7,110,359 B1 | 9/2006 | Acharya |
| 7,245,627 B2 | 7/2007 | Goldenberg et al. |
| 7,428,598 B2 | 9/2008 | Arndt et al. |
| 7,436,845 B1 * | 10/2008 | Rygh et al. ............ 370/413 |
| 7,477,639 B2 | 1/2009 | Shimizu et al. |
| 7,483,442 B1 * | 1/2009 | Torudbaken et al. ........ 370/412 |
| 7,493,409 B2 | 2/2009 | Craddock et al. |
| 7,996,583 B2 * | 8/2011 | Wilkinson ............ 710/33 |
| 2003/0031183 A1 | 2/2003 | Kashyap et al. |
| 2003/0033426 A1 | 2/2003 | Beukema et al. |
| 2004/0066791 A1 | 4/2004 | Wu et al. |
| 2004/0202189 A1 | 10/2004 | Arndt et al. |
| 2004/0215848 A1 | 10/2004 | Craddock et al. |
| 2004/0218623 A1 | 11/2004 | Goldenberg et al. |
| 2005/0018669 A1 | 1/2005 | Arndt et al. |
| 2005/0100033 A1 | 5/2005 | Arndt et al. |
| 2005/0144313 A1 | 6/2005 | Arndt et al. |
| 2006/0031565 A1 | 2/2006 | Iyer et al. |
| 2006/0067346 A1 | 3/2006 | Tucket et al. |
| 2006/0129699 A1 | 6/2006 | Kagan et al. |
| 2006/0221989 A1 | 10/2006 | Basso et al. |
| 2008/0168194 A1 | 7/2008 | Gregg et al. |
| 2008/0267203 A1 | 10/2008 | Curcio et al. |
| 2008/0273539 A1 | 11/2008 | Basso et al. |
| 2009/0073999 A1 | 3/2009 | Craddock et al. |
| 2009/0077567 A1 | 3/2009 | Craddock et al. |

OTHER PUBLICATIONS

USPTO U.S. Appl. No. 11/855,479, filed Sep. 14, 2007, Craddock et al., Notice of Allowance dated Jun. 28, 2010.
USPTO U.S. Appl. No. 11/855,479, filed Sep. 14, 2007, Craddock et al., Notice of Allowance dated Mar. 16, 2010.
USPTO U.S. Appl. No. 11/855,479, filed Sep. 14, 2007, Craddock et al. Office Action dated Nov. 17, 2009.

(Continued)

*Primary Examiner* — Duc C Ho
(74) *Attorney, Agent, or Firm* — Cantor Colburn LLP; Steven Chiu (57) ABSTRACT

A receive queue provided in a computer system holds work completion information and message data together. An Infini-Band hardware adapter sends a single CQE+message data to the computer system that includes the completion Information and data. This information is sufficient for the computer system to receive and process the data message, thereby providing a highly scalable low latency receiving mechanism.

23 Claims, 8 Drawing Sheets

OTHER PUBLICATIONS

USPTO U.S. Appl. No. 11/855,562, filed Sep. 14, 2007, Craddock et al., Office Action dated Jun. 14, 2010.

USPTO U.S. Appl. No. 11/855,453, filed Sep. 14, 2007, Craddock et al., Notice of Allowance dated Dec. 17, 2009.

USPTO U.S. Appl. No. 11/855,453, filed Sep. 14, 2007, Craddock et al. Office Action dated Aug. 5, 2009.

USPTO U.S. Appl. No. 11/855,479, filed Sep. 14, 2007, Craddock et al. Office Action dated Jul. 8, 2009.

Infiniband Architecture Specification vol. 1, Rel. 1.2, Oct. 2004.

RDMA Protocol Specification (Version 1.0), Oct. 2002.

U.S. Appl. No. 11/855,479—Notice of Allowance dated Oct. 22, 2010.

* cited by examiner

ADAPTIVE LOW LATENCY RECEIVE QUEUES

CROSS REFERENCES TO RELATED APPLICATIONS

U.S. Patent Pub. No. 2009/0073999 entitled "Adaptive Low Latency Receive Queues", is assigned to the same assignee hereof, International Business Machines Corporation of Armonk, N.Y., and contains subject matter related, in certain respects, to the subject matter of the present application. The above-identified patent application is incorporated herein by reference in its entirety.

BACKGROUND OF THE INVENTION

1. Technical Field of the Invention

This invention pertains to computer system communication. In particular, this invention provides a solution for reducing low latency message reception receive queue latency.

2. Description of the Prior Art

I/O adapters define queue pairs (QPs), comprising receive queues (RQ) and send queues (SQ), for conveying messaging information from a software consumer to the adapter prior to transmission over a network fabric and for receiving massages by the consumer from an adapter coupled to the network fabric. Industry standards, such as the InfiniBand® (IB) Architecture Specification available from the InfiniBand Trade Association and iWarp from the RDMA Consortium, specify that the message information carried on QPs is in the form of a work queue element (WQE) that carries control information pertaining to the message. The above-identified documents are incorporated herein by reference in their entirety. Also, one or more data descriptors point to the message data to be transmitted or the location at which received messages are to be placed.

Low latency message passing is a critical function in high performance computing applications. Typical data exchanges between system memory and InfiniBand adapters that are required to receive messages consume sizable amounts of time.

Some RQ applications have a need to reduce the latency incurred during data transfer operations. There is a need for a mechanism to enhance the standard RQ operations so that the lower latencies required by these applications can be achieved.

SUMMARY OF THE INVENTION

The present invention provides the ability to store variable length receive messages and completion information on a single receive queue in system memory which provides an extremely efficient mechanism for system software to poll received messages and identify their source. It also provides the standard InfiniBand protection mechanisms in hardware.

An object of the present invention is to provide a computer system with receive queues implemented in host system memory whereby the message data and work completion information are provided to the system in a single transfer over the processor local bus. The completion information can comprise standard IB completion information. The primary method and structure by which the present inventive embodiment achieves low latency reception is to minimize communication back and forth between the hardware adapter and memory.

Another object of the present invention is a hardware adapter coupled to the host system and to a network fabric for transferring data messages. The adapter comprises a QP Context identifying RQ status, storage buffers, etc. The host system receives data transfers from the adapter comprising Completion Queue Element (CQE) information and payload data. An embodiment of the present invention comprises CQEs as the work completion information. The adapter receives network packets each containing header information sufficient for the adapter to build a corresponding data message to the system comprising the CQE information and data, and also to provide the standard protection checks required by the IB architecture.

Another object of the present invention is to implement a Low Latency Receive Queue (LLRQ) for the unreliable datagram (UD) transport service. In an environment comprising thousands of nodes communicating over IB fabrics and routers, the present invention provides the benefit of scalability for these large clusters. For a reliable connected transport service each node requires a QP. That type of configuration starts to breakdown with large clusters because of the demand on memory for the number of QPs required. A single LL RQ implementation in system memory according to the present invention provides better cache coherency, less memory usage, and less resources required by receiving packets from thousands of nodes onto a single LL RQ.

Another object of the present invention includes a data processing system and a method implemented by the data processing system whereby low latency data packets intended to be processed by the data processing system are received from a network, in particular an IB network, and examined as to their low latency status. Higher latency packets are processed in the usual manner well known to those skilled in the prior art. Low latency data packets, in particular unreliable datagram (UD) packets, take full advantage of the present embodiment of the invention. If an incoming packet is examined and determined to be a low latency unreliable datagram, then the packet is directed by front end hardware to a dedicated low latency input buffer in an adapter that is coupled to a host system and which together comprise the data processing system. The received UD packet includes a packet header containing various information fields, one of which is a queue pair (QP) number, and a payload. This QP number is used by the adapter as an index to access an entry in a QP Context table which contains further information concerning the received UD packet, for example, such as a tail pointer, free entry count, and a page table pointer. The adapter is then able to build a data message that is sent to the host system for processing in a single data transfer step that avoids typical higher latency overhead such as address translation and address fetches between the adapter and host system. The data message includes its own header, referred to as a CQE, described above, that is prepended by the adapter to the received UD packet's data payload. The CQE contains information derived from the QP Context table and also from the received UD packet header such as packet size and remote QP ID information, for example. This enables the adapter to calculate a size of the CQE+data payload and to include size information in the CQE for use by the host system.

The host system includes a receive queue for storing received data messages from the adapter until they are processed by the host system. The receive queue includes a plurality of uniformly sized slots equivalent to the size of a single cache line as architected in the host system. A received date message can occupy one or more slots in the receive queue, however, each data message begins on a slot boundary with its CQE portion, followed by the data portion. The tail pointer information in the QP Context table indicates to the adapter a memory location of a next available slot in the receive queue.

An important element of the CQE comprises a valid bit, which is polled by the host system to determine if the data message is ready to be processed by the host system. If the valid bit is set, the host system reads and processes the data message. Thus, it is necessary that the data portion and the CQE portion of the data message be stored by the adapter in the receive queue before the adapter sets the valid bit. The host system, and the adapter, uses the size information field contained in a CQE to determine at which slot boundary the next data message's CQE is located. The next data message's CQE comprises the beginning of the next data message. Because of this, it is also necessary for the adapter to clear the valid bit in the next data message's CQE before setting the valid bit in the CQE of the current data message.

If a data message is larger than one receive queue slot, the latter slots are loaded prior to loading the first slot, because the first slot contains the CQE and the valid bit, which is set in the final step of the receive queue loading procedure. If a size of the data message fits into one receive queue slot, then the CQE and data portions are stored atomically by the adapter, which includes the valid bit being set. The term "atomically" means that all information within a slot is visible to the processor at the same time.

The adapter is comprised of the number of unoccupied available receive queue slots through use of the free entry count adder registers, mentioned above, which updates the count of the number of available slots stored in the free entry count register. The adapter decrements this count according to the number of receive queue slots consumed for each data message sent to the host system. After the host system completes processing of one or more data messages in the receive queue, it sends a count of the number of slots released to the free entry count adder register, which is added to the free entry count register by the adapter.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

The above as well as additional objectives, features, and advantages of the present invention will become apparent in the following written description.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
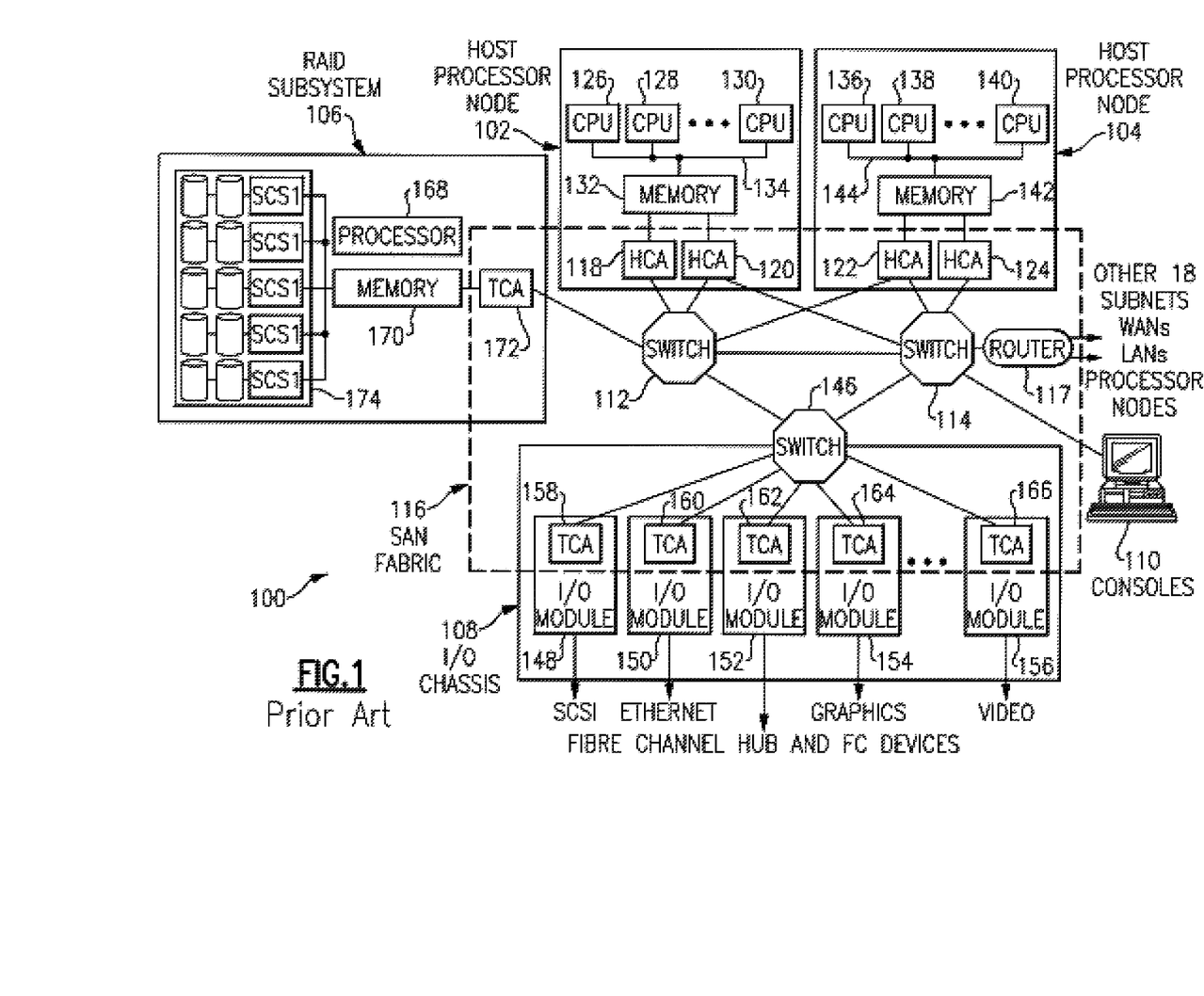
FIG. 1 is a prior art diagram of a distributed computer system that is an exemplary operating environment for embodiments of the present invention.

FIG. 1 is a prior art diagram of a distributed computer system where exemplary embodiments may be implemented. The distributed computer system represented in FIG. 1 takes the form of a System Area Network (SAN) 100 and is provided merely for illustrative purposes. Exemplary embodiments of the present invention described below can be implemented on computer systems of numerous other types and configurations. For example, computer systems implementing the exemplary embodiments can range from a small server with one processor and a few input/output (I/O) adapters to massively parallel supercomputer systems with hundreds or thousands of processors and thousands of I/O adapters.

Referring to FIG. 1, a SAN 100 is a high-bandwidth, low-latency network for interconnecting nodes within a distributed computer system. A node is any component attached to one or more links of a network and forming the origin and/or destination of messages within the network. In the example depicted in FIG. 1, the SAN 100 includes nodes in the form of host processor node 102, host processor node 104, redundant array independent disk (RAID) subsystem node 106, and I/O chassis node 108. The nodes illustrated in FIG. 1 are for illustrative purposes only, as SAN 100 can interconnect any number and any type of independent processor nodes, I/O adapter nodes, and I/O device nodes. Any one of the nodes can function as an end node, which is herein defined to be a device that originates or finally consumes messages or packets in SAN 100. In exemplary embodiments, an error handling mechanism in distributed computer systems is present in which the error handling mechanism allows for reliable connection and for reliable datagram communication between end nodes in distributed computing systems, such as SAN 100.

A message, as used herein, is an application-defined unit of data exchange, which is a primitive unit of communication between cooperating processes. A packet is one unit of data encapsulated by networking protocol headers and/or trailers. The headers generally provide control and routing information for directing the packet through SAN 100. The trailer generally contains control and cyclic redundancy check (CRC) data to verify that packets are not delivered with corrupted contents.

The SAN 100 depicted in FIG. 1 contains the communications and management infrastructure supporting both I/O and interprocessor communications (IPC) within a distributed computer system. The SAN 100 shown in FIG. 1 includes a switched communications fabric 116, which allows many devices to concurrently transfer data with high-bandwidth and low-latency in a secure, remotely managed environment.

End nodes can communicate over multiple ports and utilize multiple paths through the SAN fabric. The multiple ports and paths through the SAN shown in FIG. 1 can be employed for fault tolerance and increased bandwidth date transfers.

The SAN 100 in FIG. 1 includes three switches 112, 114, and 146, and router 117. A switch is a device that connects multiple links together and allows routing of packets from one link to another link within a subnet using a small header destination local identifier (DLID) field. A router is a device that connects multiple subnets together and is capable of routing packets from one link in a first subnet to another link in a second subnet using a large header destination globally unique identifier (DGUID).

In one embodiment, a link is a full duplex channel between any two network fabric elements, such as end nodes, switches, or routers. Example suitable links include, but are not limited to, copper cables, optical cables, and printed circuit copper traces on backplanes and printed circuit boards.

For reliable services, end nodes, such as host processor end nodes and I/O adapter end nodes, generate request packets and return acknowledgment packets. Switches and routers pass packets along, from the source to the destination. Except for the variant CRC trailer field, which is updated at each stage in the network, switches pass the packets along unmodified. Routers update the variant CRC trailer field and modify other fields in the header as the packet is routed.

In SAN 100 as illustrated in FIG. 1, host processor node 102, host processor node 104, and I/O chassis 108 include at least one channel adapter (CA) to interface to SAN 100. In exemplary embodiments, each CA is an endpoint that implements the CA interface in sufficient detail to source or sink packets transmitted on SAN fabric 118. Host processor node 102 contains CAs in the form of Host Channel Adapters (HCAs) 118 and 120. Host processor node 104 contains HCAs 122 and 124. Host processor node 102 also includes central processing unit 126-130 and a memory 132 interconnected by bus system 134. Host processor node 104 similarly includes central processing units 136-140 and a memory 142 interconnected by a bus system 144. HCAs 118 and 120 provide a connection from host processor node 102 to switch 112, while HCAs 122 and 124 provide a connection from host processor node 104 to switches 112 and 114.

In exemplary embodiments, an HCAs is implemented in hardware. In this implementation, the HCA hardware offloads much of the central processing unit I/O adapter communication overhead. This hardware implementation of the HCA also permits multiple concurrent communications over a switched network without the traditional overhead associated with communication protocols. In one embodiment, the HCAs and SAN 100 in FIG. 1 provide the I/O and IPC consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. The I/O chassis 108 in FIG. 1 includes an I/O switch 146 and multiple I/O modules 148-156. In these examples, the I/O modules 148-156 take the form of adapter cards. Example adapter cards illustrated in FIG. 1 include a SCSI adapter card for I/O module 148; an adapter card to fibre channel hub and fibre channel arbitrated loop (FC-AL) devices for I/O module 152; an Ethernet adapter card for I/O module 150; a graphics adapter card for I/O module 154; and a video adapter card for I/O module 156. Any known type of adapter card can be implemented. I/O adapters also include a switch in the I/O adapter to couple the adapter cards to the SAN fabric. These modules contain target channel adapters (TCAs) 158-166. In the example depicted in FIG. 1, the RAID subsystem node 106 includes a processor 168, a memory 170, a TCA 172, and multiple redundant and/or striped storage disk units 174. TCA 172 can be a fully functional HCA.

SAN 100 handles data communications for I/O and interprocessor communications. SAN 100 supports high-bandwidth and scalability required for I/O and also supports the extremely low latency and low CPU overhead required for interprocessor communications. User clients can bypass the operating system kernel process and directly access network communication hardware, such as HCAs, which enable efficient message passing protocols. SAN 100 is suited to current computing models and is a building block for new forms of I/O and computer cluster communication. Further, SAN 100 in FIG. 1 allows I/O adapter nodes to communicate with each other or to communicate with any of the processor nodes in distributed computer systems. With an I/O adapter attached to the SAN 100 the resulting I/O adapter node has substantially the same communication capability as any host processor node in SAN 100.

In exemplary embodiments, the SAN 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the packet transmitted from a source process specifies a destination processes' communication port, but does not specify where in the destination processes' memory space the packet will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data packet containing the destination buffer memory address of the destination process. In memory semantics, the destination process previously grants permission for the source process to access its memory.

Channel semantics and memory semantics are typically both utilized for I/O and interprocessor communications. A typical I/O operation employs a combination of channel and memory semantics. In an illustrative example I/O operation of the distributed computer system shown in FIG. 1, a host processor node, such as host processor node 102, initiates an I/O operation by using channel semantics to send a disk write command to a disk I/O adapter, such as RAID subsystem Target Channel Adapter (TCA) 172. The disk I/O adapter examines the command and uses memory semantics to read the date buffer directly from the memory space of the host processor node. After the data buffer is read, the disk I/O adapter employs channel semantics to push an I/O completion message back to the host processor node.

In exemplary embodiments, the distributed computer system shown in FIG. 1 performs operations that employ virtual addresses and virtual memory protection mechanisms to ensure correct and proper access to all memory. Applications running in such a distributed computer system are not required to use physical addressing for any operations.

U.S. Patent Pub. No. 2008/0168194 entitled "Low Latency Send Queues in I/O Adapter Hardware", and U.S. Patent Pub. No. 2009/0073978 entitled "Low Latency Multicast for Infiniband® Host Channel Adapters", and U.S. Patent Pub.

No. 2009/0077268 entitled "Low Latency Multicast for Infiniband Host Channel Adapters", are assigned to the same assignee hereof, International Business Machines Corporation of Armonk, N.Y., all of which are incorporated herein by reference. In addition, U.S. Patent Pub. No. 2005/0100033 entitled "InfiniBand® General Services Queue Pair Virtualization for Multiple Logical Ports on a Single Physical Port", and U.S. Patent Pub. No. 2005/0018669 entitled "InfiniBand.® Subnet Management Queue Pair Emulation for Multiple Logical Ports on a Single Physical Port", and U.S. Patent Pub. No. US 2005/0144313 entitled "InfiniBand® Multicast Operation in an LPAR Environment", and U.S. Patent Pub No. 2004/0202189 entitled "Apparatus, System and Method for Providing Multiple Logical Channel Adapters Within a Single Physical Channel Adapter in a System Area Network", are assigned to the same assignee hereof, International Business Machines Corporation of Armonk, N.Y., all of which are incorporated herein by reference.

Figure 2:
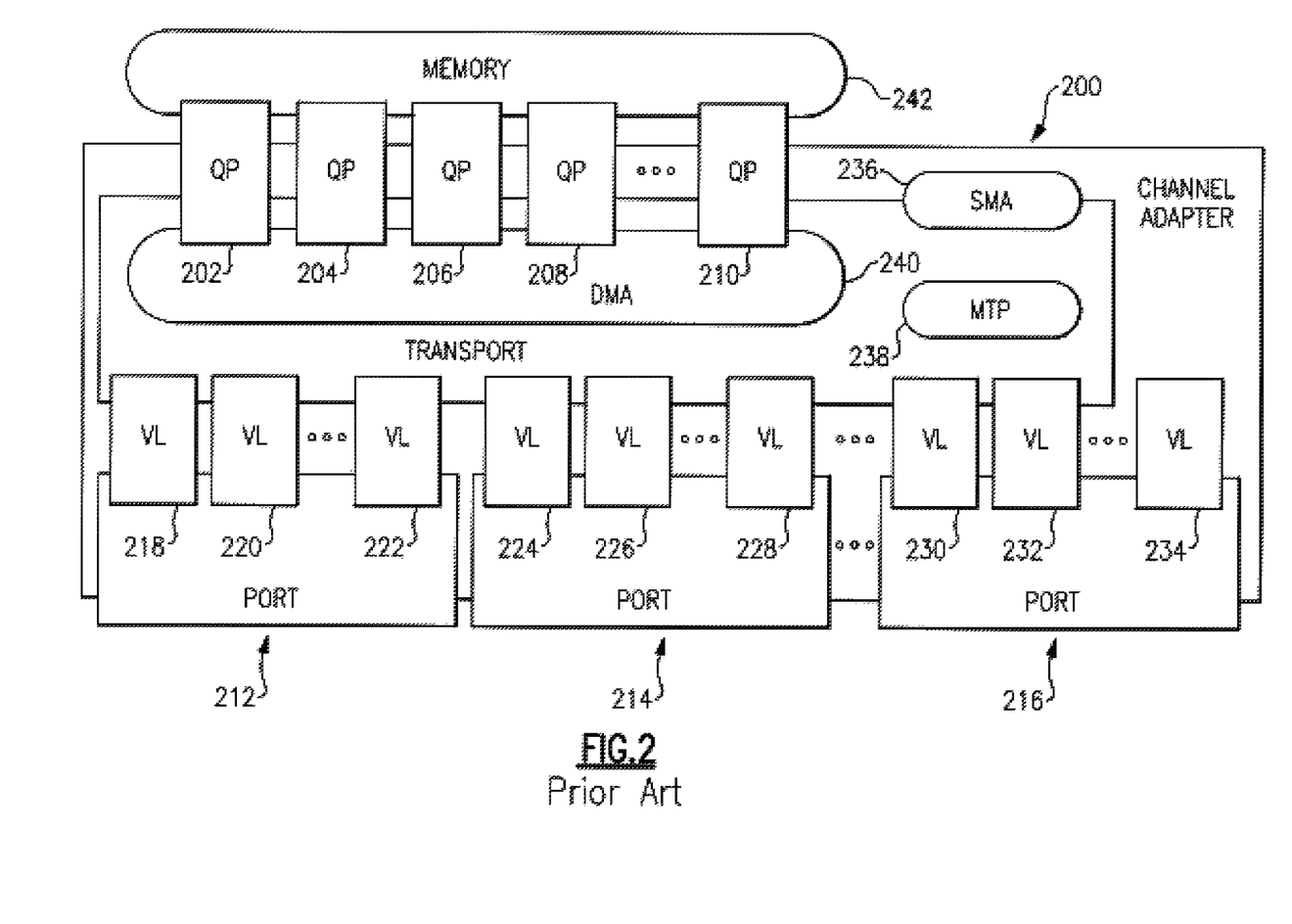
FIG. 2 is a prior art diagram of a host channel adapter that is part of an exemplary operating environment for embodiments of the present invention.

With reference now to FIG. 2, a prior art diagram of an HCA 200 is depicted. HCA 200 shown in FIG. 2 includes a set of QPs 202-210, which is used to transfer messages to the HCA ports 212-216. Buffering of data to HCA ports 212-216 is channeled through virtual lanes (VL) 218-234 where each VL has its own flow control. Subnet manager configures the channel adapter with the local addresses for each physical port, i.e., the port's local identifier (LID). Subnet manager agent (SMA) 236 is the entity that communicates with the subnet manager for the purpose of configuring the channel adapter. Memory translation and protection (MTP) 238 is a mechanism that translates virtual addresses to physical addresses and validates access rights. Direct memory access (DMA) 240 provides for DMA operations using memory 242 with respect to QPs 202-210.

A single channel adapter, such as the HCA 200 shown in FIG. 2, can support thousands of QPs. By contrast, a TCA in an I/O adaptor typically supports a much smaller number of QPs. Each QP consists of two work queues, a send queue (SQ) and a receive queue (RQ). The SQ is used to send channel and memory semantic messages. The RQ receives channel semantic messages. A consumer calls an operating system specific programming interface, which is herein referred to as a "verbs interface", to place work requests (WRs) onto a work queue.

Figure 3:
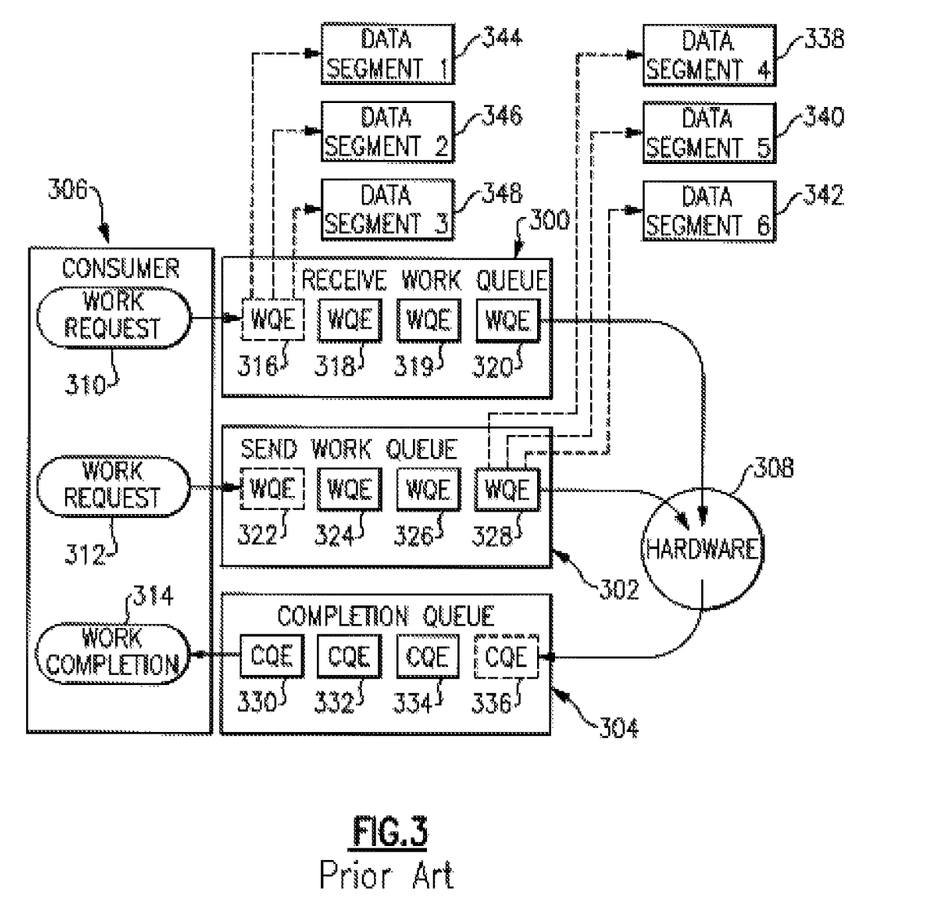
FIG. 3 is a prior art diagram illustrating processing of work requests that is part of an exemplary operating environment for embodiments of the present invention.

With reference now to FIG. 3, a prior art diagram illustrating processing of work requests is depicted. In FIG. 3, RQ 300, SQ 302, and completion queue (CQ) 304 are present for processing requests from and for consumer 306. These requests from consumer 306 are eventually sent to hardware 308. In this example, consumer 306 generates work requests 310 and 312 and receives work completion 314. As shown in FIG. 3, work requests placed onto a work queue are referred to as work queue elements (WQEs).

SQ 302 contains WQEs 322-328, describing data to be transmitted on the SAN fabric. RQ 300 contains WQEs 318-320, describing where to place incoming channel semantic data from the SAN fabric. A WQE is processed by hardware 308 in the HCA. Each QP is managed through a QP context, which is a block of information that pertains to a particular QP, such as the current WQEs, Packet Sequence Numbers, transmission parameters, etc.

The verbs interface also provides a mechanism for retrieving completed work from CQ 304. As shown in FIG. 3, CQ 304 contains completion queue elements (CQEs) 330-336. CQEs contain information about previously completed WQEs. CQ 304 is used to create a single point of completion notification for multiple QPs. A CQE is a data structure on a CQ that describes a completed WQE. The CQE contains sufficient information to determine the QP and specific WQE that completed. A CQ context is a block of information that contains pointers to, length, and other information needed to manage the individual CQs.

Example WRs supported for the SQ 302 shown in FIG. 3 are as follows. A Send WR is a channel semantic operation to push a set of local data segments to the data segments referenced by a remote node's receive WQE. For example, WQE 328 contains references to data segment 4 338, data segment 5 340, and data segment 6 342. Each of the send WR's data segments contains a virtually contiguous memory space. The virtual address used to reference the local data segments are in the address context of the process that created the local QP.

In exemplary embodiments, RQ 300 shown in FIG. 3 only supports one type of WQE, which is referred to as a receive WQE. The receive WQE provides a channel semantic operation describing a local memory space into which incoming send messages are written. The receive WQE includes a scatter list describing several virtually contiguous memory spaces. An incoming send message is written to these memory spaces. The virtual addresses are in the address context of the process that created the local QP.

For interprocessor communications, a user-mode software process transfers data through QPs directly from where the buffer resides in memory. In exemplary embodiments, the transfer through the QPs bypasses the operating system and consumes few host instruction cycles. QPs permit zero processor-copy data transfer with no operating system kernel involvement. The zero process-copy data transfer provides for efficient support of high-bandwidth and low-latency communication.

When a QP is created, the QP is set to provide a selected type of transport service. In exemplary embodiments a distributed computer system implementing the present invention supports four types of transport services: reliable connection, unreliable connection, reliable datagram, and unreliable datagram (UD) service.

Figure 4:
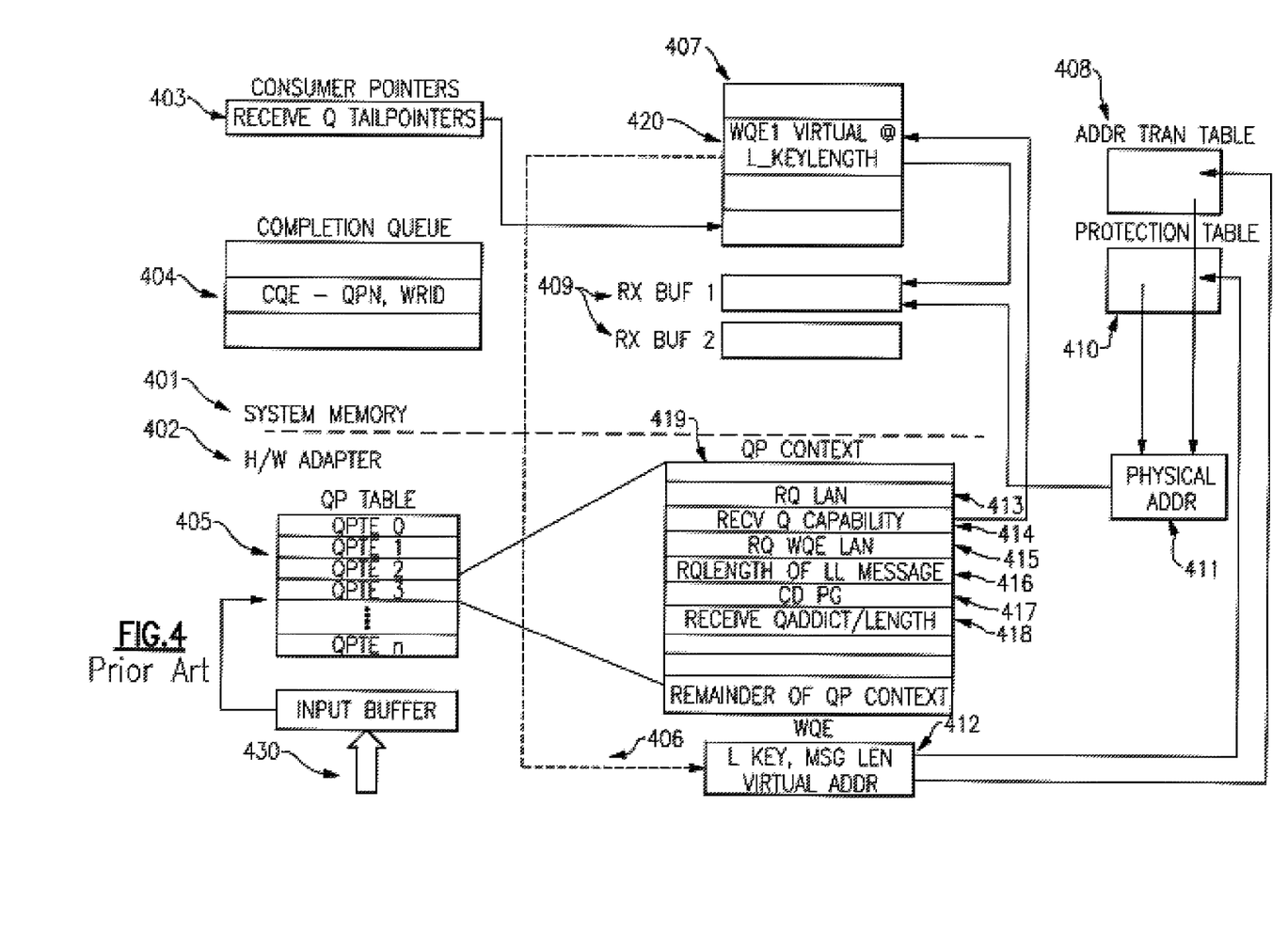
FIG. 4 illustrates prior art standard receive queue operation.

With reference now to FIG. 4, a prior art diagram illustrating standard QP processing for handling message reception is depicted. Shown below the dotted line are parts of an InfiniBand channel adapter 402, frequently referred to simply as "hardware" herein, which is typically in the form of an adapter card inserted into the host computer system via an adapter slot configured in the host system for the purpose of coupling the adapter to the host system. Above the dotted line is system side memory 401 structured to hold a receive queue 407, receive buffers 409, tail pointer 403, tables for generating addresses 408 and 410, and CQE information 404. The sequence of operations for a standard RQ is as follows: an incoming message packet 430 triggers the RQ process. The packet's header contains a QP number, among other header information, to identify the target QP in the adapter. The adapter looks up the QP number in table 405 and consults the QP Context 419 of that QP. The Context contains a RQ Tail Pointer 414 which identifies a WQE 420 in the system memory RQ 407 for that packet. The adapter then fetches this WQE (dotted line 406) which contains L Key, Virtual Addr, and Msg Len data that are used to locate a buffer 409 in memory where the packet's payload will be stored. The L Key and Virtual Address information 412 is used to access the Addr Translation Table 408 and Protection Table 410 in memory which generates a physical address 411 for the adapter of the receive buffer 409 in system memory where the payload is to be stored. After the adapter stores the payload in the receive buffer Rx Buf 1 a CQE is stored by the adapter in the Completion Queue which notifies the system software that a data message has been received and stored. The CQE includes a QP number (QPN) which identifies which RQ the message was received in. The CQE also includes a work request ID (WRID) which identifies the WQE 420 that was just processed which, in turn, identifies the buffer Rx Buf 1 where the received message is stored. It will be noted that already there have been several time consuming communications between the system memory and the hardware to store an incoming message, e.g., fetching WQE, generating physical address.

Figure 5:
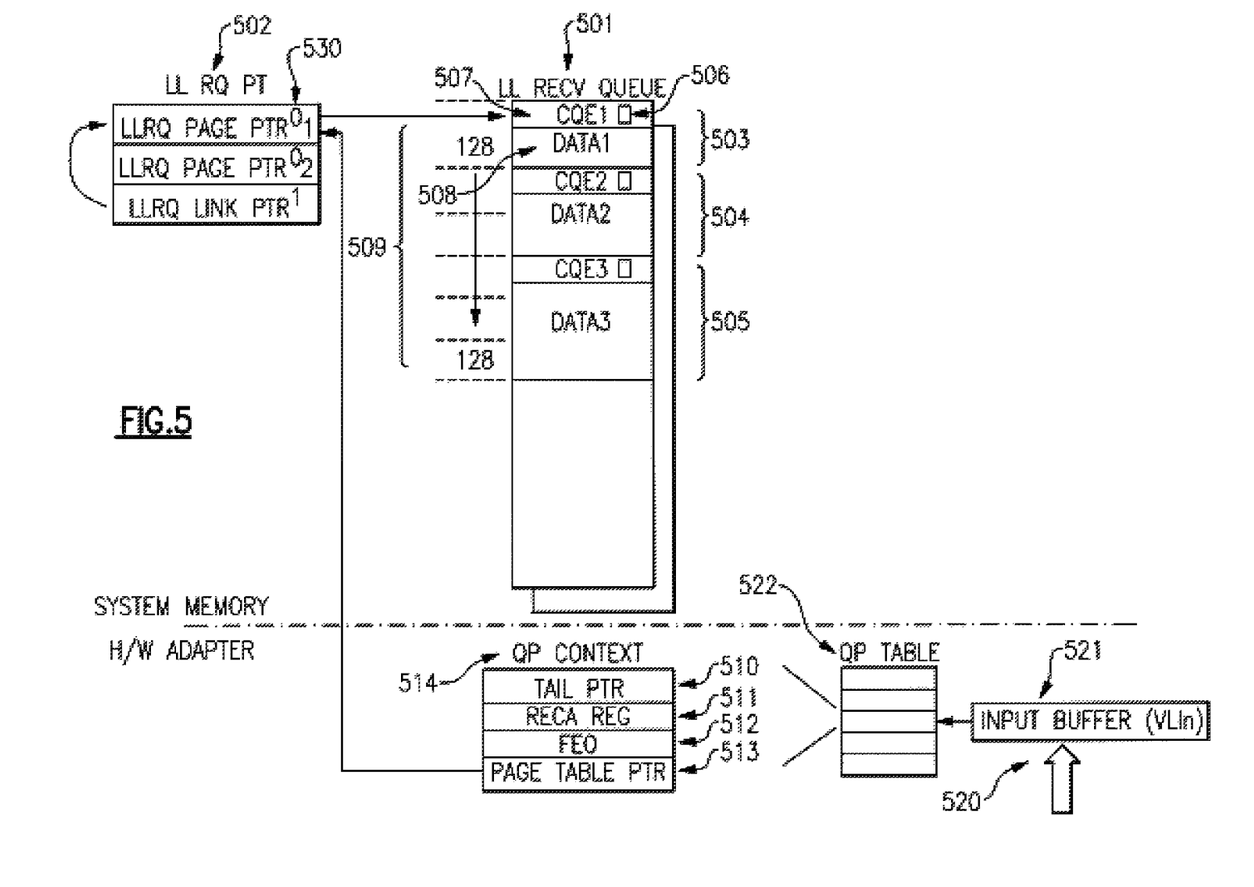
FIG. 5 illustrates an improved receive queue configuration according to an embodiment of the present invention.

With reference to FIG. 5, a diagram illustrating an improved apparatus and method for implementing a low latency receive queue (LLRQ) 501 of the present invention is depicted. The LLRQ 501 is structured in system memory containing a number of 128 byte slots 509, e.g. 503, for CQE+data messages. There are typically several LL RQs per port in system memory. Each received message in an RQ comprises a 16 byte CQE field 507, although the leading CQE field could have any preselected size, with the remainder 508 for holding data. Some of the data in the CQE is obtained from the incoming packet header by the adapter, such as Remote LID, identifying a sending device, and Remote QP number, identifying a remote QP of the sending device. If the payload data comprises 112 bytes or less, it will occupy one of these standard slots, such as 503. However, if the data portion is larger than 112 bytes, then additional contiguous slots can be used for holding the data portion, as exemplified by Data2 (an extra 128 bytes) in data message 504 and Data3 (two extra slots) in data message 505. The CQE+message data is transferred by the adapter to the depicted low latency receive queue 501.

The adapter recognizes that the system side is configured as an LL RQ when it obtains the QP Context 514 (or 419) information based on the QP number in the incoming message 520. The adapter then builds, for example, a 128 byte low latency message 503 containing a CQE 507 and payload data 508 for a single transfer over the system bus without undertaking the extra steps of fetching the corresponding WQE, address translation, etc., as in the prior art procedure. The adapter accomplishes this build by obtaining the QP number from an incoming packet 520 stored in a receive buffer 521. The QP number is used to access the QP Table 522 which contains QP Context information 514 for building the CQE. It should be noted that all low latency messages can be dedicated to a single VL. This is more efficient in conjunction with the present invention because standard longer messages in the same VL may cause waiting low latency messages to be unnecessarily delayed. Well known front end hardware would initially receive incoming messages and steer the low latency messages to the buffer 521 that is implemented as a dedicated Virtual Lane Input (VLin) buffer. More efficient processing is also achieved because the VLin buffer identifies incoming messages as low latency, rather than by obtaining the QP number of the incoming packet and fetching its corresponding QP Context information. This would allow a dedicated low latency receive engine to identify the receive message as requiring low latency processing. There may be several VLin buffers in a hardware adapter for processing incoming messages, depending on the system's processing power, as well as several hardware adapters connected to the host system.

Although an example embodiment slot size of 128 bytes is illustrated herein, slots of any size may be constructed. It may be advantageous to select a slot size corresponding to a standard cache line of the computer system that implements the present invention. The Power Architecture™, owned and manufactured by IBM Corp., utilizes 128 byte cache lines. The particular embodiment described herein will, therefore, include reference to 128 byte transfers from system memory, however, the invention is not limited to such an architecture and can be implemented in architectures having standard cache lines of different length.

In the preferred embodiment of FIG. 5, the CQEs are shown each starting at 128 byte boundaries 509. Each CQE contains a CQE valid bit 506 which, when it's set, tells the system that a valid data message is entirely received in the RQ. The CQE also defines the length of its data which is used by the system to identify on which 128 boundary the next CQE begins. Hence, it is important that the valid bit in the next CQE (e.g. CQE 2) be cleared first (e.g. set to logical "0") before the valid bit for the present CQE (e.g. CQE 1) is set (e.g. logical "1"). The data for the present CQE must be visible to the processor, for example, in the system memory, entirely before its valid bit is set. The valid bit indicates to the system that the data for the message is received and can be read and, together with the message length information, where the next CQE begins.

The adapter needs to know how many received messages the system has processed in order to avoid overrunning the RQ. The Free Entry Count Adder (FECA) 511 is a register in the adapter's QP Context 514. A memory mapped I/O (MMIO) store to this register in the QP context causes the hardware to add the number stored to the FEC. The FEC 512 is initialized to the number of 128 byte slots in the RQ. As the adapter stores messages to the RQ it decrements the FEC count by the number of slots it consumes. As the system processes a message, 503, 504, or 505, and frees up slots it will store a 1, 2, or 3, respectively, to the FECA causing the hardware to increment the FEC accordingly. Optionally, the system can process all these messages first, then store a 6 to the FECA. If a message is received that would consume more slots than are available, as indicated by the FEC, the UD packet is silently dropped. This silent drop will not consume any slots.

The hardware uses physical addresses to point to the pages that make up the RQ in the system memory, a separate address for each page, while the tall pointer 510 increments within a page. The hardware uses the page table 502 in system memory that contains page table pointers which reference the pages that make up the receive queue. When the hardware reaches the page boundary it fetches the next entry in the page table 502 which gives the address of the next page in the queue. Then the tail pointer 510 is updated with the new entry and it works its way down the page. Embedded in each page table entry is a link bit 530 set in the pointer, to 0 or 1, so that it knows when it reaches the end of the page table to wrap back to the first page in the queue. Using 4K pages the page boundaries can be hit quickly, with an extra fetch across the bus each time for fetching the next page pointer. Hence, large pages, such as 16 M, are more efficient.

Figure 6:
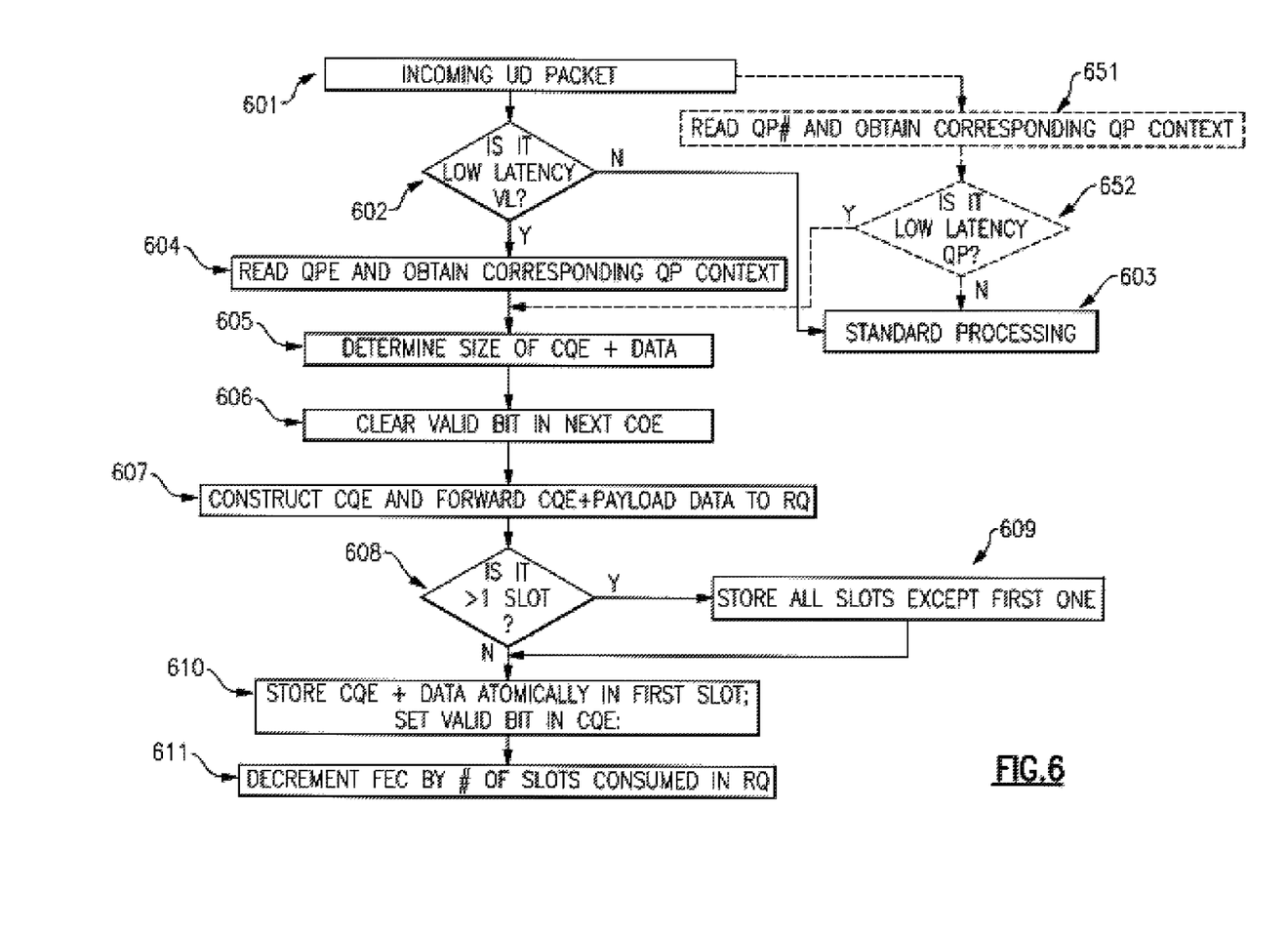
FIG. 6 illustrates a flow chart of embodiments of the present invention.

With reference to FIG. 6, a flowchart showing implementation of a method of the present inventive embodiment is depicted. At step 601 an incoming UD packet arrives at front end hardware. At step 602 a determination is made whether the packet is received in a dedicated low latency Virtual Lane. If it is not, then the packet is processed in a standard fashion 603. If it is a low latency packet received in the low latency VLin buffer then, at step 604, the QP number is read and the corresponding QP Context information is obtained for forming the CQE portion of the data message. At step 605 the size of the CQE and data portions is determined from packet header information. At step 606, the adapter clears the valid bit in the next CQE, based on the known size of the current received data message. At step 607 the CQE is constructed based on the QP Context information then the CQE and payload data is forwarded to the RQ. At step 608, if the CQE+data is larger than one slot then the data portion destined for a slot or slots other than the first so is stored there, then at step 610 the data and CQE destined for the first slot is stored atomically in the first slot and the CQE Valid bit is set If at stop 608 it is determined that the CQE+payload data fits in one slot then at step 610 the CQE and data is stored atomically in the first slot and the CQE valid bit is set. At stop 611 the FEC is decremented according to the number of slots consumed in the RQ by the CQE and data.

An optional method for determining whether an incoming packet is to be received in the low latency receive queue is also illustrated in the flow chart of FIG. 6 in dashed lines. After an incoming packet is received at step 601, the adapter obtains its corresponding QP Context information based on the packet's QP number at step 651. The Context information identifies the incoming packet as a low latency UD packet or as a standard packet. At step 652, if the incoming packet is a standard packet, then it is processed in a standard fashion 603. If it is a low latency UD packet, then the processing continues at step 605, as described above, wherein the size of the CQE and data portions is determined from packet header information. Processing then continues from step 605 as described above. The above process is described in the context of an UD packet, however, it will be appreciated to one skilled in the art that the above technique is equally applicable to other types of transport services such as reliable connection, unreliable connection, and reliable datagram.

Figure 7:
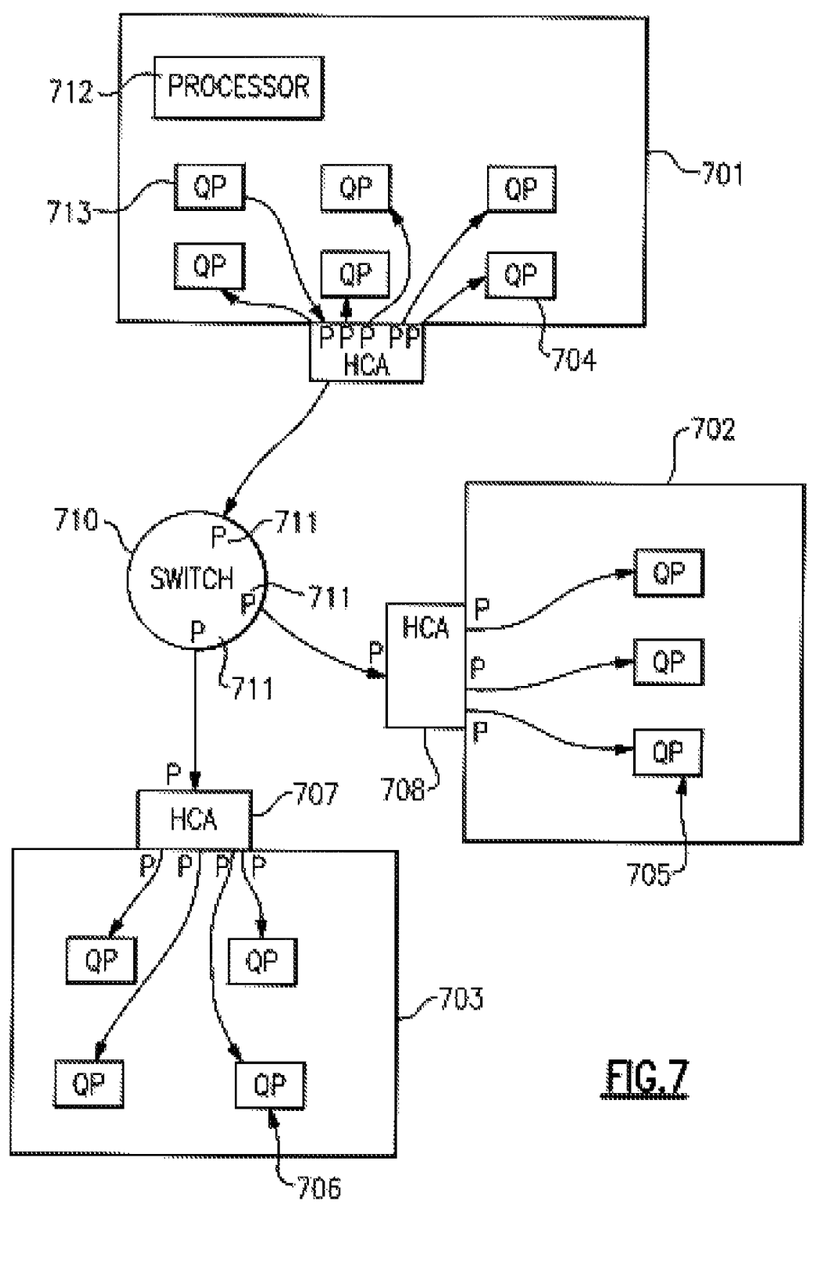
FIG. 7 illustrates an embodiment of a computer system in which the techniques of the present invention nay be practiced.

FIG. 7 illustrates a representative workstation or server hardware system in which the present invention may be practiced. The system 700 of FIG. 7 comprises a representative computer system 701, such as a personal computer, a workstation or a server, including optional peripheral devices. The workstation 701 includes one or more processors 706 and a bus employed to connect and enable communication between the processor(s) 706 and the other components of the system 701 in accordance with known techniques. The bus connects the processor 706 to memory 705 and long-term storage 707 which can include a hard drive, diskette drive or tape drive for example. The system 701 might also include a user interface adapter, which connects the microprocessor 706 via the bus to one or more interface devices, such as a keyboard 704, mouse 703, a Printer/scanner 710 and/or other interface devices, which can be any user interface device, such as a touch sensitive screen, digitized entry pad, etc. The bus also connects a display device 702, such as an LCD screen or monitor, to the microprocessor 706 via a display adapter.

The system 701 may communicate with other computers or networks of computers by way of a network adapter capable of communicating 708 with a network 709. Example network adapters are communications channels, token ring, Ethernet or modems. Alternatively, the workstation 701 may communicate using a wireless interface, such as a CDPD (cellular digital packet data) card. The workstation 701 may be associated With such other computers in a Local Area Network (LAN) or a Wide Area Network (WAN), or the workstation 701 can be a client in a client/server arrangement with another computer, etc. All of these configurations, as well as the appropriate communications hardware and software, are known in the art.

Figure 8:
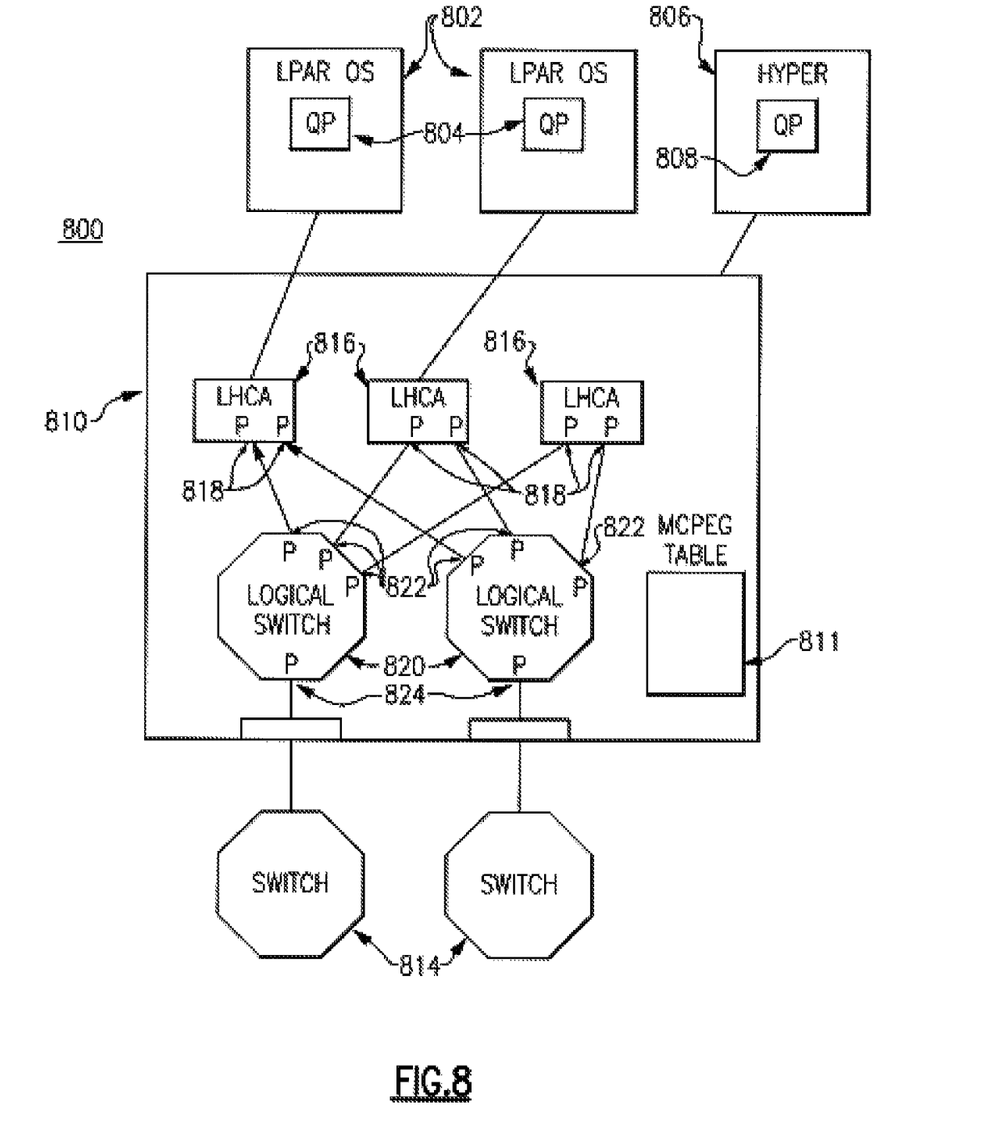
FIG. 8 illustrates an embodiment of a data processing network in which the techniques of the present invention may be practiced.

FIG. 8 illustrates a data processing network 800 in which the present invention may be practiced. The data processing network 800 may include a plurality of individual networks, such as a wireless network and a wired network, each of which may include a plurality of individual workstations 801, 802, 803, 804. Additionally, as those skilled in the art will appreciate, one or more LANs may be included, where a LAN may comprise a plurality of intelligent workstations coupled to a host processor.

Still referring to FIG. 8, the networks may also include mainframe computers or servers, such as a gateway computer (client server 806) or application server (remote server 808 which may access a data repository and may also be accessed directly from a workstation 805). A gateway computer 806 serves as a point of entry into each network 807. A gateway is needed when connecting one networking protocol to another. The gateway 806 may be preferably coupled to another network (the Internet 807 for example) by means of a communications link. The gateway 806 may also be directly coupled to one or more workstations 801, 802, 803, 804 using a communications link. The gateway computer may be implemented utilizing an IBM server zSeries® Server available from IBM Corp.

Turning to FIG. 7, software programming code which embodies the present invention is typically accessed by the processor 706 of the system 701 from long-term storage media 707, such as a CD-ROM drive or hard drive. The software programming code may be embodied on any of a variety of known media for use with a data processing system, such as a diskette, hard drive, or CD-ROM. The code may be distributed on such media, or may be distributed to users 810, 811 (FIG. 8) from the memory or storage of one computer system over a network to other computer systems for use by users of such other systems.

Alternatively, the programming code 711 may be embodied in the memory 705, and accessed by the processor 705 using the processor bus. Such programming code includes an operating system which controls the function and interaction of the various computer components and one or more application programs. Program code is normally paged from dense storage media 707 to high-speed memory 705 where it is available for processing by the processor 706. The techniques and methods for embodying software programming code in memory, on physical media, and/or distributing software code via networks are well known and will not be further discussed herein.

Alternative Embodiments

It should be noted that the present invention, or aspects of the invention, can be embodied in a computer program product, which comprises features enabling the implementation of methods described herein, and which, when loaded in a host computer system or in an adapter, is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and for (b) reproduction in a different material form. For the purposes of this description, a computer program product or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Devices described herein that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device nay be alternatively be embodied by one or more other devices which are not explicitly described as having such functionality/features. Thus, other embodiments need not include the device itself.

Therefore, the foregoing description of the embodiments has been presented for the purposes of illustration and description. It is not intended to be exhaustive or to limit the embodiments to the precise form disclosed. Many modifications and variations are possible in light of the above teaching.

We claim:

1. An adapter for processing and sending received low latency data packets to a low latency receive queue and for sending standard data packets for standard processing to a standard latency receive queue, the adapter comprising:
   a processor configured for receiving low latency data packets each having a packet header and payload data, for processing information contained in the packet header to construct completion queue information, for constructing a low latency data message comprising the completion queue information and the payload data, and for sending the constructed data message to a receive queue in a single transfer.

2. The adapter of claim 1, wherein the receive queue comprises:
   a plurality of slots each for storing the completion queue information and the payload data.

3. The adapter of claim 2, wherein the completion queue information comprises data for identifying a length of the low latency data message.

4. The adapter of claim 3, wherein each of said plurality of slots contains data storage space equal to an amount of data in a cache line.

5. The adapter of claim 4, wherein completion queue information stored in the low latency receive queue comprises a bit for indicating that the completion queue information and payload data of a low latency data message has been stored in the receive queue and is visible to a processor in a host system.

6. The adapter of claim 5, wherein the information identifying the length of the low latency data message is used by a host system to identify a next slot wherein a subsequent CQE valid bit will be stored for clearing the subsequent CQE valid bit before its message data is stored.

7. The adapter of claim 5, wherein a low latency data message longer than one slot is stored in the receive queue such that the completion queue information is stored in the first slot and the first slot is stored last.

8. The adapter of claim 3, wherein the adapter further comprises:
   a first register for identifying a number of available slots in the low latency receive queue; and
   a second register for identifying a number of recently released slots in the receive queue to be added to the first register, and wherein a host system updates the second register.

9. The adapter of claim 8, wherein the adapter is coupled to a low latency receive queue page table for storing memory location addresses of the low latency receive queue and wherein the adapter accesses the low latency receive queue page table for obtaining the location addresses.

10. A computer system comprising:
    a memory;
    a processor connected to said memory;
    an adapter slot for coupling a network adapter to the computer system;
    a low latency receive queue for storing low latency data messages each comprising a completion queue element and data which is received by the computer system via the adapter slot from the network adapter; and
    the completion queue element comprising a valid bit indicating that the entire completion queue element and data is stored in the receive queue and is visible to the processor,
    wherein the computer system sends receive queue status information to the network adapter for identifying a number of slots available in the receive queue.

11. The computer system of claim 10, wherein the computer system further includes a page table for identifying to the network adapter system memory locations where the receive queue slots are located.

12. The computer system of claim 10, wherein the receive queue comprises a plurality of slots each for storing one of the low latency data messages received from the attached adapter.

13. The computer system of claim 12, wherein each of said plurality of slots is capable of storing an amount of data equal to that stored in a cache line of the computer system.

14. The computer system of claim 10, further comprising:
    a plurality of additional adapter slots having network adapters attached therein each comprising a low latency virtual lane input buffer.

15. A hardware adapter for coupling to a host system and to a network, the hardware adapter comprising:
    a standard latency input buffer for storing standard latency network packets from the network and a low latency virtual lane input buffer for storing low latency network packets from the network, each low latency packet including message data and header data for the adapter to construct a single data message comprising completion queue information and data sufficient for the host system to process the data message,
    wherein a length of the single data message is equivalent to a length of a cache line of the host system.

16. The hardware adapter of claim 15, wherein the hardware adapter further comprises a plurality of queue pair context tables and the header data includes a queue pair number for identifying which queue pair context table is associated with an incoming packet.

17. The hardware adapter of claim 15, wherein the single data message comprises a completion queue valid bit that is set by the hardware adapter only after the single data message has been received by the host system and is visible to a processor of the host system.

18. The hardware adapter of claim 17, wherein the host system comprises a receive queue having a plurality of slots for storing a plurality of said single data messages sent by the hardware adapter.

19. The hardware adapter of claim 18, wherein the hardware adapter clears a completion queue valid bit of a succeeding data message to be stored in a next slot of the receive queue prior to sending a preceding single data message to the receive queue.

20. A non-transitory computer readable medium embodying a program of instructions executable by a computer to perform a method comprising:
  determining if an incoming data packet is a low latency unreliable datagram;
  if the incoming packet is determined to be the low latency unreliable datagram, then receiving the packet in a dedicated low latency input buffer;
 reading a queue pair number in the received packet;
  obtaining queue pair context information corresponding to the queue pair number; and
  constructing a completion queue element based on the queue pair context information and on information in a header of the received packet and combining the completion queue element with payload data of the received packet into a current single data message sufficient for the host computer system to complete processing of the data message.

21. The program product according to claim 20, the method further comprising:
  determining a size of the current single data message based on information in the header of the received packet and on the size of the completion queue element; and
  providing a receive queue in the host system comprising a plurality of slots each for storing, until processed by the host system, one of a plurality of single data messages or, if any single data message is larger than one slot, then storing a portion of the single data message, wherein each single data message begins at a slot boundary with the completion queue element preceding the data portion.

22. The program product according to claim 21, the method further comprising:
 providing a valid bit in the completion queue element for indicating to a processor of the host system, when the valid bit is set, that the current single data message has been entirely stored in the receive queue and is visible to the processor.

23. The program product according to claim 22, the method further comprising:
 determining at which slot in the receive queue a single data message immediately succeeding the current single data message will begin;
 clearing a valid bit in the completion queue element field of the single data message immediately succeeding the current single data message in the receive queue; and
 after clearing the valid bit sending the current single data message to the host system for storing in the receive queue.

* * * * *